United States Patent
Ette

(10) Patent No.: US 10,479,321 B2
(45) Date of Patent: Nov. 19, 2019

(54) METHOD FOR OPERATING A RADIO-BASED MONITORING SYSTEM OF A TRANSPORTATION VEHICLE AND MONITORING SYSTEM AND TRANSMITTING AND RECEIVING UNIT FOR THE MONITORING SYSTEM

(71) Applicant: VOLKSWAGEN AKTIENGESELLSCHAFT, Wolfsburg (DE)

(72) Inventor: Bernd Ette, Wolfsburg (DE)

(73) Assignee: Volkswagen Aktiengesellschaft (DE)

( * ) Notice: Subject to any disclaimer, the term of this patent is extended or adjusted under 35 U.S.C. 154(b) by 0 days.

(21) Appl. No.: 16/223,589

(22) Filed: Dec. 18, 2018

(65) Prior Publication Data

US 2019/0193680 A1   Jun. 27, 2019

(30) Foreign Application Priority Data

Dec. 21, 2017   (DE) ......................... 10 2017 223 564

(51) Int. Cl.
*B60R 25/24* (2013.01)
*B60R 25/10* (2013.01)

(52) U.S. Cl.
CPC .............. *B60R 25/24* (2013.01); *B60R 25/10* (2013.01)

(58) Field of Classification Search
CPC ................................ B60R 25/24; B60R 25/10
USPC .................................... 340/10.1, 10.3, 12.55
See application file for complete search history.

(56) References Cited

U.S. PATENT DOCUMENTS

| 6,946,949 B2* | 9/2005 | Heide ..................... B60R 25/24 340/5.61 |
| 8,412,638 B2* | 4/2013 | Yeap ....................... G06F 21/43 705/71 |
| 10,393,855 B2* | 8/2019 | Terhoerst .............. G01S 5/0273 |
| 2015/0097653 A1* | 4/2015 | Gibbs ................ G06K 7/10366 340/10.1 |
| 2017/0236351 A1 | 8/2017 | Menard et al. |

(Continued)

FOREIGN PATENT DOCUMENTS

| DE | 19747732 A1 | 5/1999 |
| DE | 10014207 A1 | 10/2001 |
| DE | 10344583 A1 | 5/2005 |

(Continued)

*Primary Examiner* — Joseph H Feild
*Assistant Examiner* — Rufus C Point
(74) *Attorney, Agent, or Firm* — Barnes & Thornburg LLP

(57) ABSTRACT

A method for operating a wireless-based monitoring system of a transportation vehicle, wherein tag units are held in the transportation vehicle by a respective retention device and each retention device includes a mechanical encoding through which a spatial orientation of the held tag unit is specified. Each tag unit determines its spatial orientation and its characteristic position in the transportation vehicle by its own position sensor apparatus, and each tag unit repeatedly captures a distance from at least one predetermined object by its own distance measuring apparatus, and the central control unit determines a respective object position of the at least one object based on the respective characteristic position of the tag units and of the distances signaled respectively by these tag units and controls at least one predetermined security function in the transportation vehicle.

48 Claims, 7 Drawing Sheets

(56) References Cited

U.S. PATENT DOCUMENTS

2019/0193680 A1* 6/2019 Ette .................. B60R 25/10

FOREIGN PATENT DOCUMENTS

| DE | 102005062455 A1 | 7/2007 |
| DE | 102012213792 A1 | 2/2013 |
| DE | 102013010993 A1 | 1/2015 |
| DE | 102016007410 A1 | 12/2016 |
| DE | 112014006819 T5 | 3/2017 |

* cited by examiner

METHOD FOR OPERATING A RADIO-BASED MONITORING SYSTEM OF A TRANSPORTATION VEHICLE AND MONITORING SYSTEM AND TRANSMITTING AND RECEIVING UNIT FOR THE MONITORING SYSTEM

PRIORITY CLAIM

This patent application claims priority to German Patent Application No. 10 2017 223 564.0, filed 21 Dec. 2017, the disclosure of which is incorporated herein by reference in its entirety.

SUMMARY

Illustrative embodiments relate to a method for operating a wireless-based monitoring system of a transportation vehicle. The transportation vehicle can be protected by the monitoring system against a theft of an object out of the transportation vehicle and/or against an unauthorized unlocking of the transportation vehicle. The monitoring system and a transmitting and receiving unit, designated here as tag unit, which can be an element of the monitoring system, also belong to the disclosure.

BRIEF DESCRIPTION OF THE DRAWINGS

An exemplary embodiment is described below. Here.

DETAILED DESCRIPTION

Figure 1:
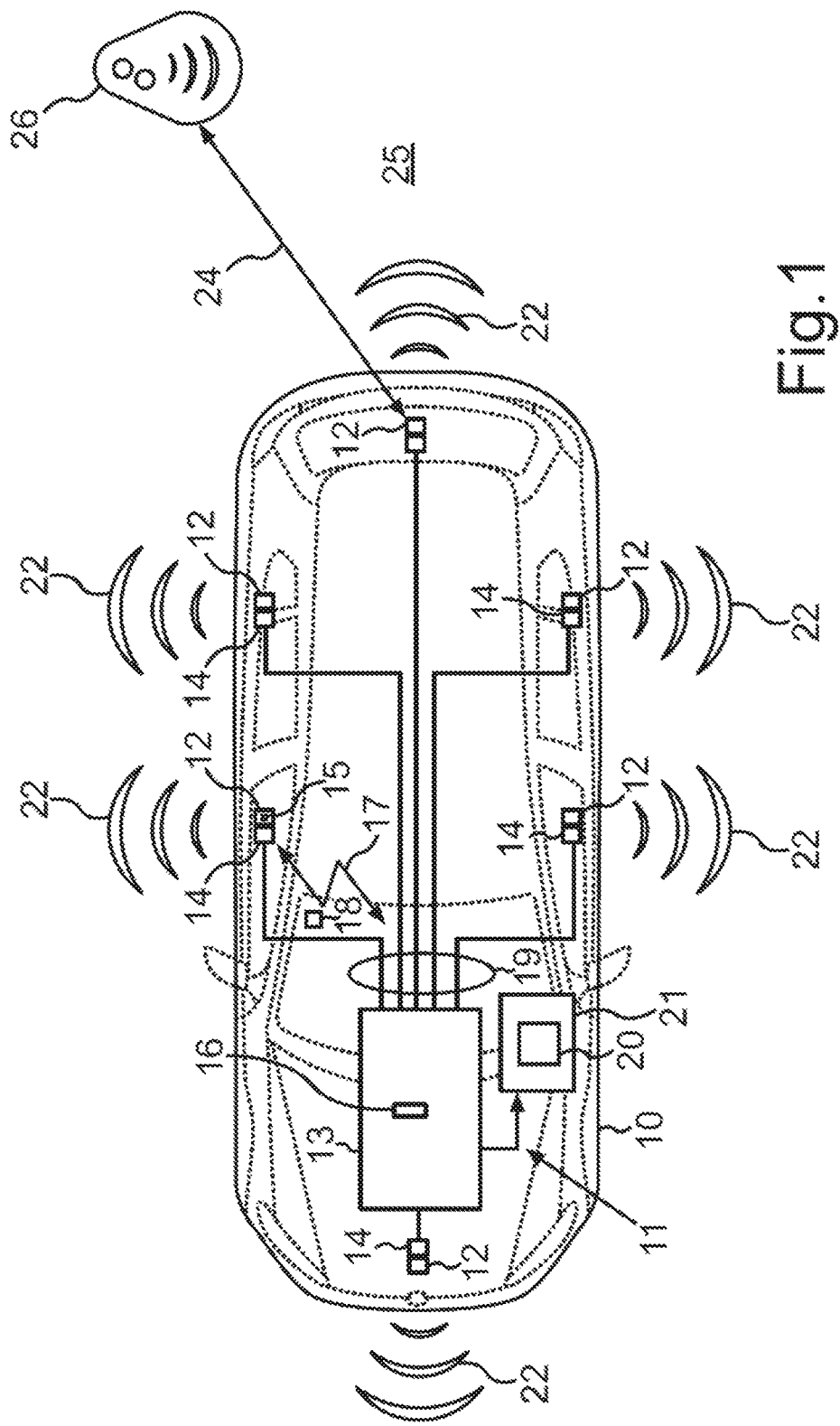
FIG. 1 shows a schematic illustration of a transportation vehicle with an exemplary embodiment of the disclosed monitoring system.

Numerous measures are known from the prior art to protect a transportation vehicle against an unauthorized unlocking.

A method is known from DE 11 2014 006 819 T5 for determining by a UWB wireless signal (UWB—Ultra White Band), in the case of a transportation vehicle, the distance between the transportation vehicle and a wireless key in the surroundings of the transportation vehicle.

A locking system with a KEYLESS GO wireless key is known from DE 10 2016 007 410 A1.

A transportation vehicle that comprises an outwardly oriented radar sensor that determines with its radar signal the distance between the transportation vehicle and a transportation user or another object in the surroundings to the rear of the transportation vehicle is known from DE 10 2013 010 993 A1. A tailgate of the transportation vehicle is operated depending on the radar signal.

The provision or retrofitting of a monitoring system in a transportation vehicle for the protection of objects against theft can be technically very complex. The protection of the transportation vehicle itself against an unauthorized unlocking of its central locking system by a manipulated wireless key also requires a technical effort that entails complex and expensive retrofitting measures.

Disclosed embodiments provide a monitoring system in a transportation vehicle that requires a low installation effort.

A method for operating a wireless-based monitoring system of a transportation vehicle is provided. The manner in which the monitoring system can be operated ensures that the monitoring system is also secure even if it has been retrofitted with a low installation effort. A central control unit and a plurality of mobile, portable transmitting units are made available for this purpose by the monitoring system. The shorter term "tag unit" is used below as a synonymous term for a "transmitting and receiving unit". The central control unit can, for example, be implemented as an element of one of the tag units, or by a separate component, for example, by a control device of the transportation vehicle or an infotainment system (information-entertainment system) of the transportation vehicle.

In the method, the tag units are held in the transportation vehicle by a respective retention device. Each retention device is a mechanical holder that is provided in the transportation vehicle for fastening or arranging the tag units. Each retention device respectively comprises a mechanical encoding through which a spatial orientation of the held tag unit is specified. Thus if one wants to insert a tag unit into a retention device, or connect it thereto, the mechanical encoding ensures that this can only be completed or carried out when the tag unit exhibits or has the spatial orientation that is constrained by the mechanical encoding. Each retention device here comprises a different mechanical encoding, and thus enforces a different spatial orientation of the held tag unit. In other words, the spatial orientation of the held tag unit is characteristic or specific or unique for the retention device in the transportation vehicle. Since each retention device has a different installation position in the transportation vehicle (e.g., front right, rear left), the spatial orientation of the held tag unit is also characteristic for the installation position in the transportation vehicle.

It is thus possible to recognize in which retention device the tag unit is located on the basis of the spatial orientation of the held tag unit, which is tantamount to the fact that the tag unit is located at a specific, known installation position in the transportation vehicle. In the method, each tag unit accordingly determines, by its own position sensor apparatus, its spatial orientation, and thereby its characteristic position in the transportation vehicle. The characteristic position corresponds with the installation position of the retention device by which the respective tag unit is held. Each tag unit then signals the characteristic position it has determined by a wireless connection to the central control unit.

In a monitoring mode of the monitoring system each tag unit, by its own distance measuring apparatus, then repeatedly captures a distance from at least one predetermined object. The distance measuring apparatus can determine the distance on the basis of at least one wireless signal and/or on the basis of ultrasound and/or radar and/or infrared radiation and/or light. Each tag unit signals the respective distance of the at least one object that it has captured by a wireless connection to the central control unit. The relative position of the at least one predetermined object from the tag units is thus also known to the central control unit. The relative position is described, in particular, as the distance. The central control unit then determines a respective object position of the at least one object on the basis of the respective characteristic position of at least one or at least a few of the tag units (not all of the tag units thus have to be used) and on the basis of the distances signaled respectively by this tag unit or these tag units. Starting from the respective characteristic position of the tag units, the position of an object can be determined, on the basis of the captured distances from the at least one object, for example, on the basis of a trilateration. The object position can, however, also be defined less precisely as a simple distance from the respective tag unit, which means that only the distance that the at least one object has respectively from the different characteristic positions of the tag units is stored. A precise indication of coordinates of the object position of the at least one object is in general not necessary for the disclosed mode of operation.

Depending on the respectively determined object position of the at least one object, the central control unit then controls at least one predetermined security function in the transportation vehicle. Thus, for example, if a monitored object is moved in the transportation vehicle, the central control unit reacts with an operation of at least one security function. At least one security function can be operated in exactly the same way if a specific object approaches the transportation vehicle.

The tag units can be inserted retrospectively into the retention devices of the transportation vehicle or can be arranged in the retention devices, and thereupon at least one object in the transportation vehicle or in the surroundings of the transportation vehicle can be monitored in respect of its object position, and a security function can be operated in the transportation vehicle depending on the object position.

At least one exemplary embodiment provides that the object position of a portable access authorization transponder of the transportation vehicle is determined. In other words, the access authorization transponder represents a monitored object. Such an access authorization transponder can, for example, be a wireless key or a mobile terminal with a mobile key function. A central locking system and/or an immobilizer of the transportation vehicle is operated as the security function that is operated depending on the object position of the access authorization transponder. The transponder units may comprise a distance measuring apparatus that can radiate a wireless signal for the access authorization transponder in two opposing directions for this purpose. It is possible hereby to reach both an access authorization transponder within the transportation vehicle as well as in the surroundings of the transportation vehicle, thus outside the transportation vehicle, by a wireless connection at any time by the distance measuring apparatus, and to determine its distance. The distance measuring apparatus may be designed for this purpose of determining the distance on the basis of a UWB wireless signal (UWB—Ultra White Band) by a transit time analysis. Such a UWB wireless signal comprises, in particular, frequencies in a range from 500 megahertz up to 15 gigahertz. Depending on the object position of the access authorization transponder, it is thus possible, for example, for the central locking system to be locked or unlocked and/or for the immobilizer of the transportation vehicle to be locked and/or unlocked.

At least one exemplary embodiment provides for this purpose that the controller of the security function presupposes or requires that the access authorization transponder must be present in the transportation vehicle during a starting attempt for starting the transportation vehicle (starting the engine). Through this it is possible to enforce that the transportation vehicle can only be started when the driver or a user of the transportation vehicle is authorized by the access authorization transponder, and takes it along with it in the transportation vehicle. The controller of the security function can, in addition or as an alternative, presuppose or require that the access authorization transponder must be present in a predetermined region surrounding the transportation vehicle during an opening attempt to open the transportation vehicle (for example, when actuating a door handle or a luggage compartment cover of the transportation vehicle). It is possible, for example, to specify that the access authorization transponder must be located in a surrounding region that borders the transportation vehicle and whose outer boundary has a distance from the transportation vehicle in a range between 2 m up to 20 m. It is possible hereby to ensure that the central locking system only autonomously unlocks during an opening attempt if the access authorization transponder is located within visual range of the transportation vehicle, or that the carrier of the access authorization transponder is in the surrounding region of the transportation vehicle.

At least one exemplary embodiment provides that the object position of an object to be protected against theft from the transportation vehicle is determined. In other words, an object that should be monitored by the monitoring system is the object to be protected. The object has a transponder unit for a distance measurement for this purpose. Through the distance measurement apparatus of each tag unit, the distance from the transponder unit at the object can thus be determined on a wireless basis, from which the object position of the object itself can be deduced. An alarm system of the transportation vehicle can be controlled as the associated security function. An alarm can hereby be triggered if the object position changes by more than a predetermined tolerance value, i.e., when the object is moved. The alarm system can thus be operated if the object is, for example, moved away from the transportation vehicle. A respective luggage item on a rooftop luggage carrier of the transportation vehicle and/or a bicycle on a bicycle rack of the transportation vehicle can for example, be secured or observed or monitored as the object. The alarm system can provide that an acoustic alarm is output. In addition or as an alternative to this, the alarm system can, for example, also send a message to a mobile terminal of an owner or user of the transportation vehicle, i.e., for example, to a smartphone.

At least one exemplary embodiment provides that the respective object position of at least one of the tag units itself is determined. In other words, the distance from at least one other tag unit is determined by at least one tag unit. One respective tag unit is then monitored as an object. The associated security function controls a function blockage of at least one predetermined function in the transportation vehicle. Protection against a manipulation of the arrangement of the tag units in the transportation vehicle is hereby provided. If a tag unit whose distance is monitored is removed from the retention device in an attempt, for example, to manipulate the monitoring system, this is recognized on the basis of the change of the distance, and the function blockage for the at least one predetermined function is triggered. If the monitoring system is, for example, used in the manner described for the control of a central locking system and/or an immobilizer by an access authorization transponder, this function can be blocked when it is recognized that the tag units used for this purpose have been moved or manipulated.

At least one exemplary embodiment provides in this connection that a change in the object position of the at least one tag unit by an amount greater than a predetermined tolerance value thereupon deactivates, through the function blockage, a keyless, wireless-based unlocking function of the transportation vehicle. The so-called KEYLESS GO function is thus no longer available in the transportation vehicle if the constellation of the arrangement of tag units used for detection of the wireless key is changed. A theft of the transportation vehicle is hereby prevented.

At least one exemplary embodiment provides that each of the tag units is held reversibly and in a manner that can be released without damage by its respective retention device. This can, for example, be realized on the basis of a snap coupling (so-called clip). The mechanical encoding can be realized in the monitoring system through, for example, at least two pins or splints in the retention device, onto which the tag unit that is to be held must be pushed. The releasable retention of the tag units has the benefit that a tag unit can be subsequently installed and/or the number of tag units used can be varied and/or tag units can be used for more than one transportation vehicle.

In at least one exemplary embodiment it is provided that an activity state of the respective tag unit is switched in each of the tag units by an individual movement sensor. A tag unit can in other words be switched on and/or switched off depending on the movement signal of a movement sensor of the tag unit. With a battery operation of the tag units, the energy consumption can be hereby reduced, in that, for example, the tag unit is switched off when it moves. The monitoring mode is thus then only activated when the transportation vehicle is stationary if monitoring or securing of the transportation vehicle is necessary.

At least one exemplary embodiment provides that the tag unit contained in the respective retention devices is supplied with electrical energy via electrical contacts in the retention device. In other words, each retention device comprises, for example, two electrodes (positive pole and negative pole), which are brought into contact with corresponding electrodes or electrical contacts of the tag unit when the tag unit is inserted or arranged in the retention device, so that an electrical voltage and an electrical current can be exchanged between the retention device and the tag unit. The electrical contacts of the retention devices can be respectively connected with, for example, an electrical on-board network of the transportation vehicle.

At least one exemplary embodiment provides that the tag units are held by the retention devices in an interior space of the transportation vehicle. A dismantling of the tag unit is thus only possible when the transportation vehicle is open. When the transportation vehicle is locked, the tag units are also protected against a manipulation. The retention devices can, for example, be arranged at the pillars of the transportation vehicle (A-pillar, B-pillar, and/or C-pillar).

At least one exemplary embodiment provides that only tag units with mechanically identical construction are made available by the monitoring system. In other words, the tag units can, for example, have an identical housing form. The benefit hereby emerges that any tag unit can be combined with any retention device.

At least one exemplary embodiment provides that the respective characteristic position of the tag units is determined and the monitoring mode is started at the beginning of a parking phase of the transportation vehicle, depending on a locking signal that indicates therefore a locking procedure of the transportation vehicle, whereby, for example, the doors of the transportation vehicle are locked. The activation of the monitoring system thus takes place with the locking of the transportation vehicle, for example, by the central locking system. It is then ensured that the transportation vehicle is in a static state, i.e., that no change to the characteristic positions of the tag units and/or of an object to be monitored in the transportation vehicle can be caused by a user. The probability of a false alarm of the monitoring system is thus reduced.

At least one exemplary embodiment provides that during a data exchange between the tag units on the one hand and the central control unit on the other hand (for example, for the wireless exchange of the described signals), respective, unique identification data specific for the respective tag unit is used as transmitter identification. Each tag unit thus identifies itself by the identification data when signaling its own position and/or the at least one captured object distance. It can then be provided here that the respective identification data is formed from unique tag identification data of the respective tag unit and unique transportation vehicle identification data specific for the transportation vehicle. In other words, a communication or a data exchange is only authorized or recognized as valid when the tag unit uses the correct combination of tag identification data and transportation vehicle identification data. A synchronization or coupling of the tag units with the transportation vehicle results from this. If the signal of a tag unit is received in another transportation vehicle, this signal will be ignored by the central control unit of the other transportation vehicle because the identification data does not match the transportation vehicle identification data of this transportation vehicle. An effect on another transportation vehicle by the transmission signal of a tag unit is hereby avoided.

At least one exemplary embodiment provides that the identification data is only assigned by the central control unit for a respective tag unit when the tag unit has captured a spatial orientation that corresponds to the mechanical encoding of one of the retention devices. In other words, the tag unit only receives valid identification data with the transportation vehicle identification data contained therein if it has been able to determine or demonstrate a spatial orientation that provides evidence that the tag unit is arranged in one of the retention devices. It is ensured hereby that only a tag unit that is correctly inserted into a retention device or arranged in a retention device is used in the monitoring mode. When a respective tag unit is removed from its retention device, the identification data in the tag unit is deleted. Thus, if the spatial orientation of the tag unit changes by more than a predetermined tolerance value, the tag unit destroys or deletes the identification data. The combined identification data is thus deleted if a tag unit is removed once from a retention device. The benefit hereby results that the transportation vehicle cannot subsequently be manipulated using, for example, a stolen tag unit. An exchange of data with the monitoring system of the transportation vehicle is no longer possible by such a tag unit.

At least one exemplary embodiment provides that a characteristic can be assigned to a tag unit. A transportation vehicle function can be adjusted, depending on the position in or at the transportation vehicle. If the characteristic of "child seat" or "rear-facing baby carrier" is assigned to a tag unit for example, the transportation vehicle security system can be adjusted to the characteristic. If the object position of a tag unit having the characteristic of "rear-facing baby carrier" is recognized at the passenger seat, the passenger airbag is deactivated. If a child seat is recognized facing forward, a seat positioning and/or an adjustment of the airbag system at the passenger seat can take place. If the object position of a tag unit with the characteristic of "child seat" or "rear-facing baby carrier" is recognized on the rear seat, an adjustment of the airbag system at the back and/or a seat adjustment of the rear seat can take place on which the child seat with the tag unit is mounted.

At least one exemplary embodiment provides that the characteristic of "external box" (roof box or rear box) is assigned to a tag unit. The object position of the tag unit at the mounted box is determined, and incorporated into the monitoring system in the monitoring mode. If the tag unit is attached to the box lid, the object position of the tag unit relative to the transportation vehicle changes in the event of a movement of the box lid, i.e., opening or dismantling the external box. An unauthorized opening or removal of the box from the transportation vehicle can be thereby concluded in the monitoring mode in the event of a change to the object position of the tag unit relative to the transportation vehicle. The tag unit is attached in a region of the box lid that is not accessible from the outside when in the closed state.

At least one exemplary embodiment provides that an object in the transportation vehicle (for example, a bag or other object kept in the transportation vehicle) can be provided with a tag unit. The tag unit can, moreover, have a characteristic of being an "accessory", or an object kept in the transportation vehicle. Depending on a transportation vehicle state, the tag unit can be incorporated in the monitoring mode. A possible transportation vehicle state can be: transportation vehicle locked or unlocked, window or sliding roof opened/closed convertible roof opened/closed For example, a tag unit with the characteristic of "bag" can automatically be incorporated in the monitoring mode if the object position of the tag unit is located in the transportation vehicle, the transportation vehicle is locked, and/or an opening element (door, window, sliding roof or a convertible roof) is open.

The monitoring system for monitoring a transportation vehicle described is also provided. The monitoring system comprises a central control unit and a plurality of mobile, portable tag units. The monitoring system is designed to carry out an exemplary embodiment of the disclosed method.

The wireless-based signaling can, for example, take place on the basis of UWB wireless signals. The communication between tag units and the central control unit can, for example, take place on the basis of WLAN (Wireless Local Area Network) and/or BLUETOOTH®.

The tag unit for the disclosed monitoring system is also provided. Such a tag unit is designed to determine its spatial orientation by its own position sensor apparatus and to signal its characteristic position in the transportation vehicle to a central control unit on the basis of the spatial orientation that has been determined. The tag unit can, for example, determine the determined orientation or the associated installation position in a transportation vehicle by an assignment specification. The position sensor apparatus can comprise at least one position sensor and/or an electronic compass for the orientation. The tag unit is furthermore designed to repeatedly measure a distance from at least one predetermined object by its own distance measuring apparatus, and to signal the distance to the central control unit.

Exemplary embodiments of the disclosed tag unit that have features as described in association with the developments of the disclosed method are also provided. For this reason the corresponding developments of the disclosed tag unit are not described here again. A plurality of the disclosed tag units can be used to form the monitoring system.

A transportation vehicle with an exemplary embodiment of the disclosed monitoring, and with retention devices for a respective tag unit of the monitoring system are also provided. Each of the retention devices respectively comprises a mechanical encoding through which a spatial orientation of the held tag unit is specified. Such a mechanical encoding can be realized through a design of a retention mechanism of the retention device. The mechanical encoding can, for example, be realized by spigots or bolts or splints onto which the tag unit must be pushed. A single splint or spigot that has an asymmetrically designed perimeter can also be provided. As a result of the respective mechanical encoding, the spatial orientation of the held tag unit is here unique for the installation position of the retention device in the transportation vehicle. In other words, each retention device in the transportation vehicle has a different mechanical encoding in respect of the spatial orientation.

The disclosure also comprises combinations of the exemplary embodiments of the method and of the tag units described.

The exemplary embodiment described below involves an exemplary embodiment. In the exemplary embodiment, the described components of the exemplary embodiment each represent single features that are to be considered independently of one another, each of which also develops the disclosed embodiments independently of one another, and are thus also to be considered individually, or in a combination other than that illustrated, as elements of the disclosure. At least one exemplary embodiment described can, moreover, also be extended through more of the features already described.

Elements with the same function are each given the same reference signs in the figures.

FIG. 1 shows a transportation vehicle 10 which can be an automobile, in particular, a passenger car or truck. A monitoring system 11 that can comprise a plurality of transmitting and receiving units or (as a short identifier) tag units 12 and a central control unit 13 can be made available in the transportation vehicle 10.

Each of the tag units 12 can be held in the transportation vehicle 10, by a respective retention device 14. Communication between the tag units 12 and the central control unit 13 can take place on a wireless basis, for example, on the basis of the WLAN standards or BLUETOOTH®. The tag units 12 are connected to the central control unit 13 when they are inserted in their respective retention device 14 and identification data are specified that are respectively formed of individual, specific tag identification data 15 and transportation vehicle identification data 16. For the sake of clarity, the tag identification data 15 are only illustrated for one tag unit 12. An energy supply of the tag unit 12 in the retention devices 14 can take place over electrical lines 19. Identification data 18 for a data exchange 17 are formed from the respective tag identification data 15 and the transportation vehicle identification data 16. Each tag unit 12 has individual, unmistakable, unique tag identification data 15. The data connection between all the tag units 12 and the control unit 11 is not active until the transportation vehicle is locked, for example, by a central locking system 20. When the transportation vehicle 10 is locked, it is here ensured by the retention devices 14 that the tag units 12 are kept at a predetermined distance from one another and with a respective, individual, spatial orientation.

A security function 21 can then be controlled by the control unit 11 on the basis of the tag units 12. The security function 21 can, for example, comprise the control of the central locking system 20. The tag units 12 can, for example, on the basis of a respective wireless signal 22, capture a respective distance 24 of at least one object 26 in the surroundings 25 of the transportation vehicle 10. An access authorization transponder 26, which can also be formed on the basis of a tag unit 12, can, for example, be captured as an object. As an alternative to this, the access authorization transponder 26 can, for example, be formed on the basis of a wireless key or of a mobile terminal, such as for example, a smartphone. The determination of the distance 24 by a respective tag unit 12 can be carried out in a manner known per se from the prior art, for example, on the basis of the UWB wireless signals described at the beginning. Each tag unit 12 can then signal the respectively determined distance 24 to the control unit 11 using the identification data 18. The control unit 11 can then control the security function 21 depending on the distance of the object 26. An unlocking of a transportation vehicle door of the transportation vehicle 10 by the central locking system 20 can, for example, only be permitted or activated or enabled when the object 26, such as the access authorization transponder 26, is located in a predetermined region in the surroundings 25 around the transportation vehicle 10, thus, for example, being arranged at a distance closer than ten meters or closer than three meters from the transportation vehicle 10.

Figure 2:
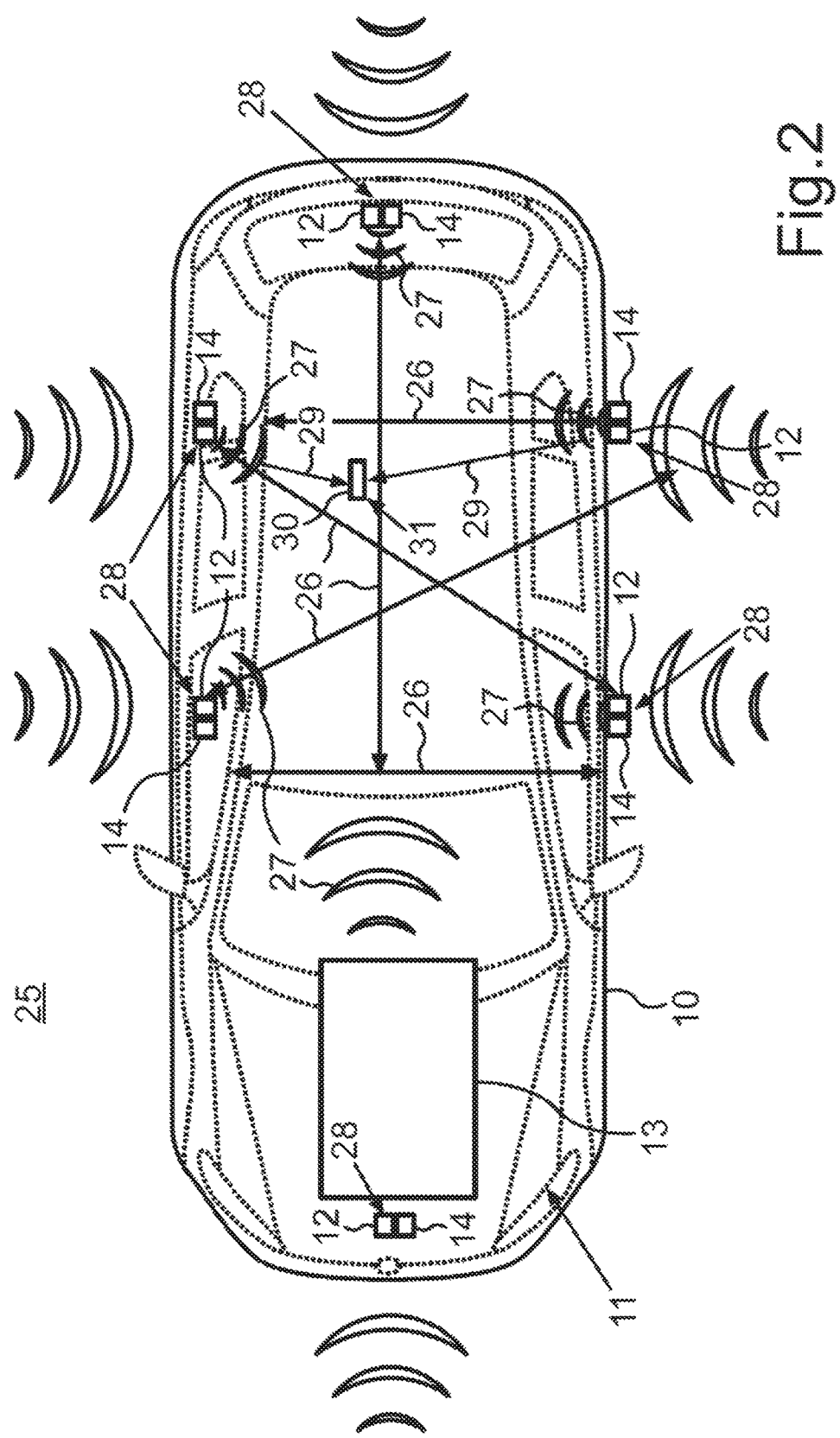
FIG. 2 shows a schematic illustration of the transportation vehicle of FIG. 1, in which the monitoring system is operated in a monitoring mode.

FIG. 2 illustrates how each tag unit 12 bidirectionally, not only from outside the transportation vehicle 10 in its surroundings 25 but also within the transportation vehicle 10, takes place a respective distance 24 from one another, for example, again on the basis of UWB wireless signals 27. The tag units 12 can also report these distances 26 to the control unit 13. The respective characteristic position 28 of each tag unit 12 can also be communicated to the control units 13 by the respective tag unit 12. Each tag unit 12 can recognize on the basis of its spatial orientation in the transportation vehicle 10 in the manner yet to be described. The control unit 13 can thus, on the basis of the characteristic positions 28 of the tag units 12 and of the distances 24 and/or 26 signaled by the tag units 12, for example, through triangulation and through knowledge of the attachment of the tag units 12 in the retention devices 14, perform the external recognition and/or internal recognition of one or more objects by UWB wireless signals 22, 27. The tag units 12 can, for example, monitor the distances 26 between themselves, and through this it is possible for the control unit 13 to recognize if a tag unit 12 is moved out of or removed from its retention device 14. Respective distances 29 from one or a plurality of mobile terminals 30 or a wireless remote control or an access authorization transponder (object 26) in general, can additionally be determined. This can also take place by the UWB wireless signals 27. Internal recognition in the transportation vehicle 10 is illustrated in FIG. 2. FIG. 1 shows the corresponding external recognition. The more tag units 12 are installed in the transportation vehicle 10, the more reliable is the recognition of a respective object position 31 by the control unit 13.

Persons who may be present in the transportation vehicle 10 can, however, also be recognized through their screening of the UWB wireless signals 27, and a person detection is itself thus also carried out in the interior. This manifests for example, as an attenuation of the UWB wireless signals 27, so that a distance 26 determined on the basis of the signal intensity has the effect during the measurement of an apparent change in the distance 26 if there is an interruption in the line of sight between two tag units 12.

Figure 3:
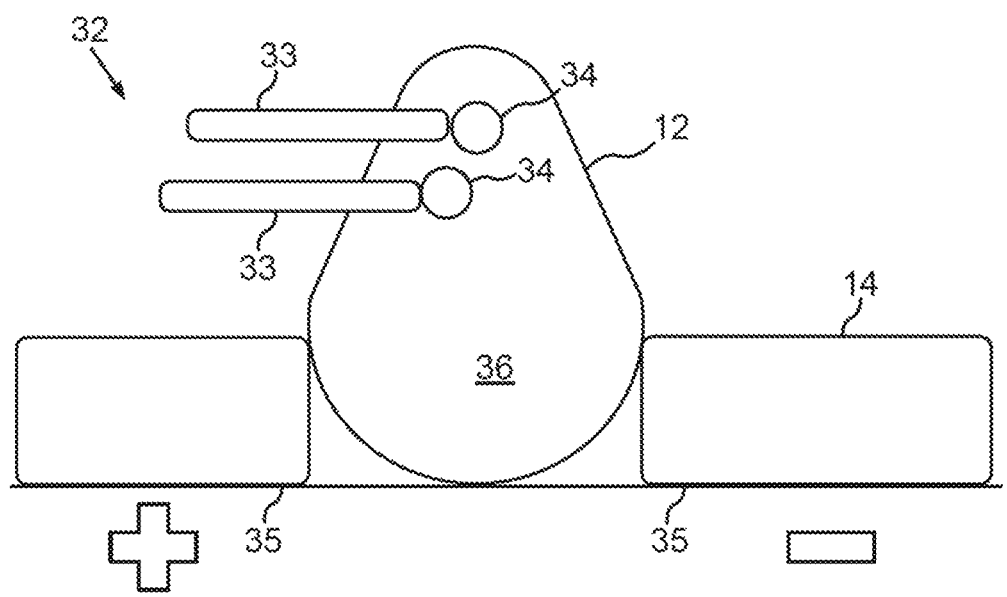
FIG. 3 shows a schematic illustration of a tag unit in a retention device, as can be made available by the monitoring system.

FIG. 3 illustrates a tag unit 12 in its retention device 14. The retention device 14, as it is illustrated in FIG. 3, represents, by way of example, the retention device illustrated in FIG. 1 and FIG. 2. Each retention device 14 can have a mechanical encoding 32 through which a spatial position of the respective tag unit held by the retention device 14 is specified. The mechanical encoding 32 can, for example, be realized on the basis of spigots or splints 33, for which each tag unit 12 has corresponding openings or recesses 34, into which the splints 33 are pushed when the tag unit 12 is fastened in the retention device 14. Each retention device 14 can, optionally, permit an electrical connection to the tag unit 12. Electrical contacts 35, which can, for example, touch a cover 36 embodied in a metallic manner of the tag unit 12 when the tag unit 12 is held in the retention device 14, can be provided for this purpose in the retention device 14. A tag unit 12 can, however, also be fitted with a battery.

The retention devices 14 may be provided in the interior of the transportation vehicle 10. The removal of a tag unit 12 is thus only possible when the transportation vehicle 10 is open. Each retention device 14 may be arranged in the transportation vehicle 10 such that it is not visible from outside. The mechanical encoding 32 may bring about a form lock with the tag unit 12 thereby to force a fixed local direction or spatial orientation during installation.

Figure 4:
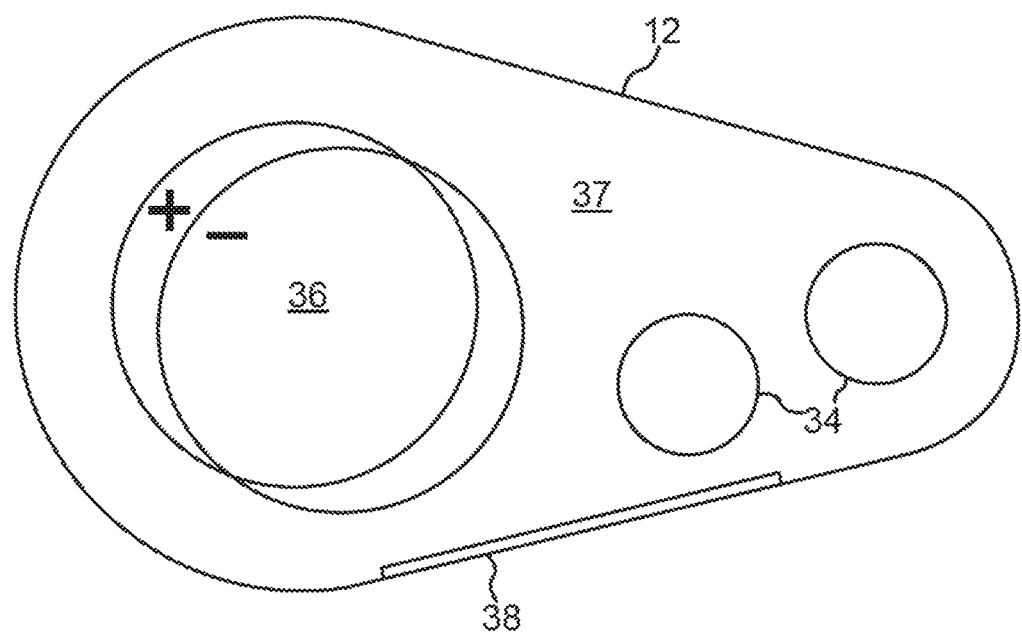
FIG. 4 shows a schematic illustration of the tag unit in the removed state.

FIG. 4 again illustrates a single tag unit 12, the housing 37 of which comprises the cover 36 embodied in a metallic manner with the two polarities, positive and negative, for the reception of the electrical voltage from the contacts 35 of the retention device 14. The recesses 34 for the form lock with the mechanical encoding 33 of a retention device 14 are furthermore illustrated. It is shown, lastly, that an antenna 38 for generating the UWB wireless signals can be arranged, for example, on an inner wall of the housing 14. A maximum dimension of the tag unit 12 can lie in a range of between four centimeters up to 15 centimeters.

Figure 5:
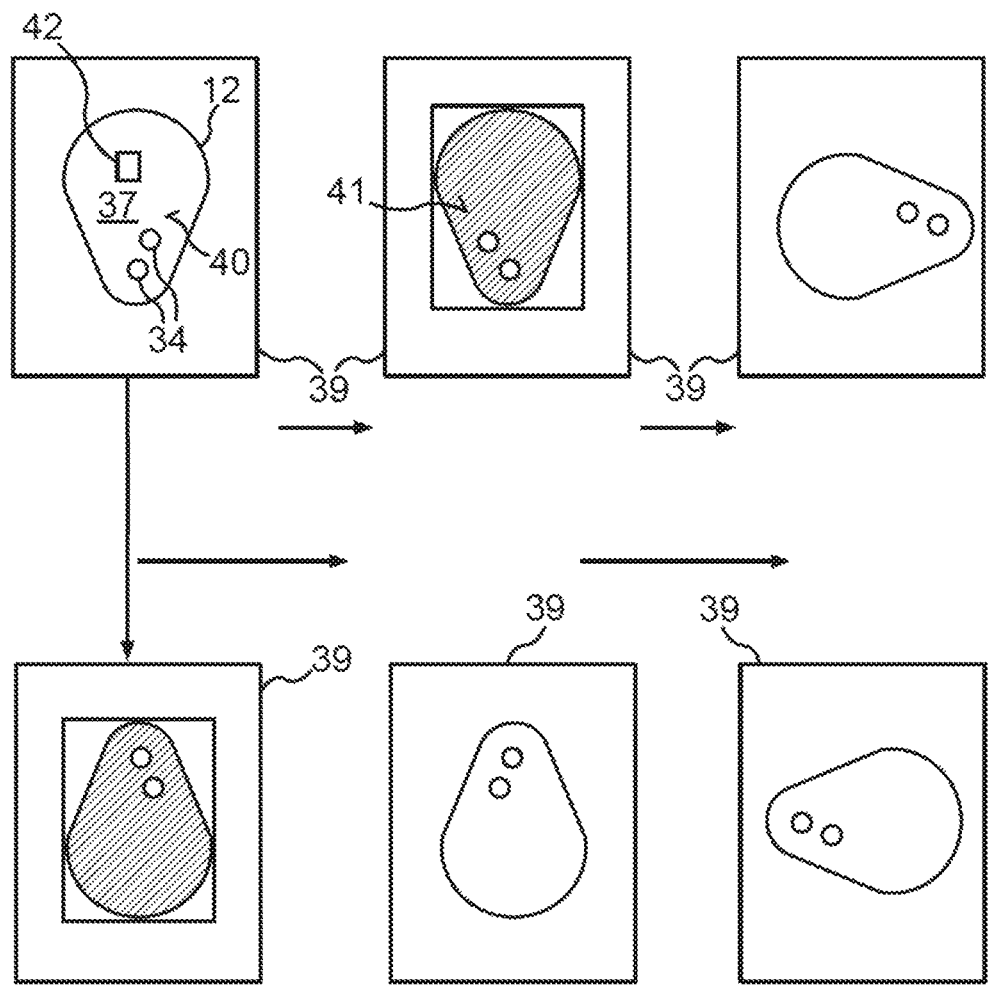
FIG. 5 shows a schematic illustration of the tag unit in different spatial orientations, as the tag unit can be forced to adapt by a mechanical encoding of retention devices of the monitoring system.

FIG. 5 illustrates how different spatial orientations 39 of a tag unit 12 can be forced through different mechanical encodings. A front face 40 and a rear face 41 of the tag unit 12 are here identified or distinguished by a shading of the rear side 41. The different spatial orientations 39 result from the corresponding different arrangement of the mechanical encoding 32 of the retention devices 14. Each tag unit 12 can comprise its own position sensor apparatus 42, by which the current spatial orientation 39 of the tag unit 12 can be recognized. This position sensor apparatus 42 can, for example, comprise, in addition to at least one position sensor for a respective spatial axis, also an electronic compass for the determination of an absolute alignment in the earth's magnetic field. The positions of the tag units 12 are thus specified by the installation location in the transportation vehicle 10, namely the respective installation location 28 of the retention devices 14. The position sensor apparatus 42 of each tag unit 12 recognizes the characteristic position 28 of the tag unit 12 with reference to the spatial orientation 39. An exchange of a tag unit 12, or a partial fitting with only one tag unit, is thus also possible, since the central unit 13 has the characteristic position 28 of each installed tag unit 12 communicated to it. Through an eyelet or recess 34 that is introduced, each tag unit 12 is held in a form-locked manner always in a different spatial orientation 39 with respect to the transportation vehicle 10, depending on in which retention device 14 the tag unit 12 is currently arranged.

Figure 6:
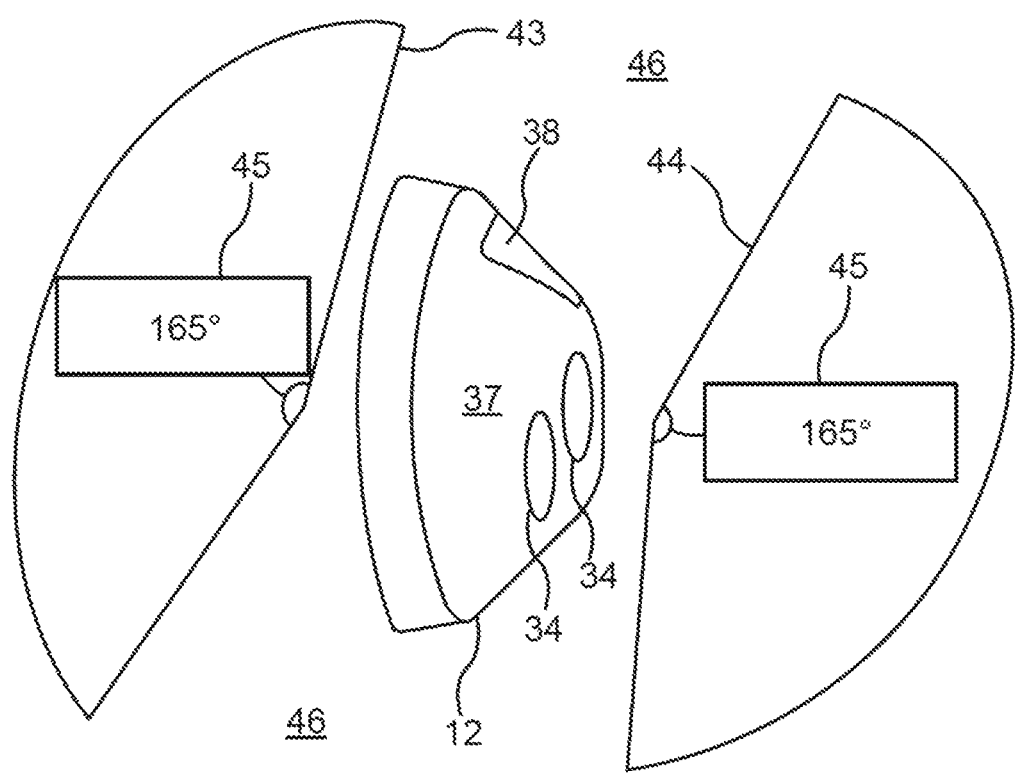
FIG. 6 shows a schematic illustration of the tag unit with illustrated capture regions of a distance measuring unit of the tag unit.

FIG. 6 illustrates how, through the antenna structures 38, a radiation characteristic 43 for the transmission of the UWB wireless signals 22 into the surroundings 25 and a radiation characteristic 44 for the radiation of the UWB wireless signals 27 into the interior of the transportation vehicle 10 can be realized. An exemplary aperture angle 45 of the radiation characteristics 43, 44 can, for example, be 165 degrees, wherein this value is only exemplary. It may be provided in the transportation vehicle 10 that the retention devices 14 have an installation position in the transportation vehicle 10 through which, with a tag unit 12 arranged respectively in the retention device 14, an intermediate region 46 between the radiation characteristics 43, 44 is aligned parallel to the nearest window pane of the transportation vehicle 10. The plane of this window pane does not have to be supplied with a wireless signal.

Figure 7:
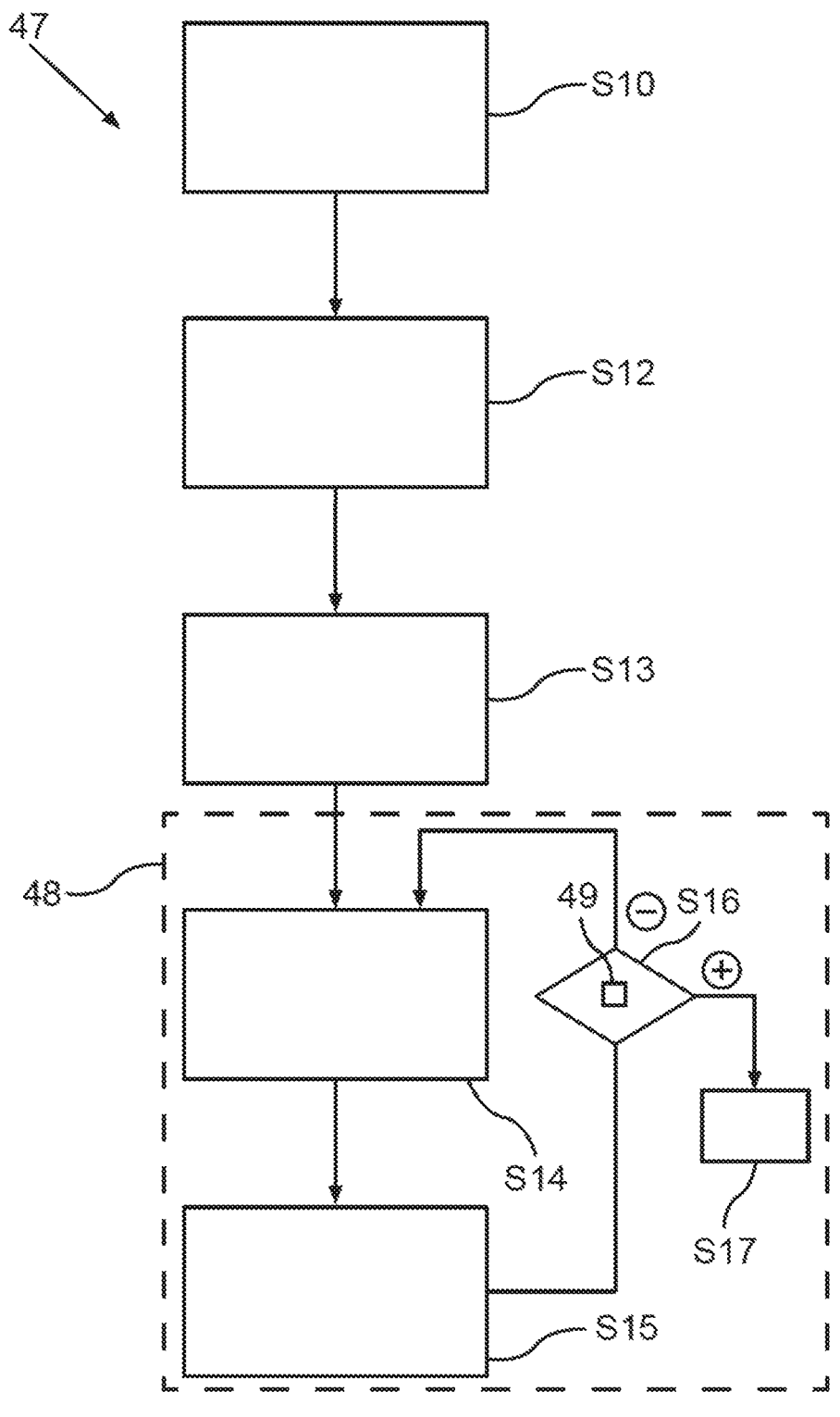
FIG. 7 shows an illustrative flow diagram of a method that can be carried out in the transportation vehicle for operation of the monitoring system.

FIG. 7 illustrates a method 47 that can be carried out in the transportation vehicle 10 for operation of the monitoring system 11. In an operation at S10, the central control unit 13 and the tag units 12 are initially made available by the monitoring system 11. The control unit 13 can, for example, be formed by an infotainment system or a control device of the transportation vehicle 10.

In an operation at S12, the tag units are held in the transportation vehicle 10 by a respective retention device 14, and their spatial orientation 39 is specified by the mechanical encoding 32 of the retention devices 14. Each tag unit can determine its spatial orientation 39 in an operation at S13 by its position sensor apparatus 42, and transmit this by a wireless connection to the control unit 13, for example, on the basis of WLAN or BLUETOOTH® or a UWB wireless signal.

A monitoring mode 48 can thus be started, for example, on locking the transportation vehicle 10 by the central locking system 20. In the monitoring mode 48, each tag unit, by the distance measurement apparatus 38, repeatedly captures the respective distance 24, 26, 29 from at least one object (for example, the access authorization transponder 26, another tag unit 12 and/or mobile terminal 31) in an operation at S14 and signals this by a wireless connection to the central control unit 13.

In an operation at S15, a respective object position of the at least one object (for example, coordinates or a distance from a respective characteristic position 28) can be determined by the central control unit 13 on the basis of the respective characteristic position 28 of at least one or a few of the tag units 12 and of the distances 24, 26, 29 signaled respectively by this tag unit 12 or these tag units 12. In an operation at S16 a check can be made by the control unit 13 as to whether a position change or change in the respective object position of the at least one object resulting during the monitoring mode 48 is larger than a predetermined tolerance value 49. If this is not the case (symbolized in FIG. 7 by a "−" sign), then it is possible to continue with the distance monitoring in operation S14. If, on the other hand, the change of the object position is greater than the tolerance value 49 (symbolized in FIG. 7 by a "+" sign), the security function 21 is operated, i.e., for example, the central locking system 20 is unlocked if an access authorization transponder 26 is located within a predetermined region around the transportation vehicle 10, or a tag unit 12 is moved or the mobile terminal 31 is removed from the transportation vehicle 10.

It can also be provided that one of the tag units 12 at an object to be secured, for example, a bicycle held at the transportation vehicle 10 with its position outside the transportation vehicle 10, is secured or monitored. For this purpose, when the transportation vehicle 10 is stationary, its connection to this tag unit 12 can be established through a wireless connection, and the characteristic position of the tag unit 12 captured. Through locating the tag unit 12 at the object through the other tag units 12, the distance of the tag unit 12 at the object, and thereby the object position of this object, can now be measured. After the alarm system of the transportation vehicle 10 has been fully armed, this object, i.e., for example, the bicycle, is thus secured with the tag unit attached there in terms of its object position with respect to the transportation vehicle 10. If the transportation vehicle 10 is unlocked, and the alarm system or theft warning system is thereby disarmed, the tag unit 12 at this object is also deactivated. The tag unit 12 can continue to remain at the object, i.e., for example, the bicycle, and can be reactivated by a wireless connection. A tag unit 12 can be battery-operated, and can here comprise a movement sensor which better exploits the battery lifetime of the battery of the tag unit 12, in that the tag unit 12 is switched off, for example, after a predetermined time from the beginning of a movement of the tag, as, for example, results when the transportation vehicle 10 is driven, and can be reactivated again when stationary.

The tag unit 12 fastened at the object can also be used for wireless-based rediscovery of the object if the object is removed from the transportation vehicle 10.

The transportation vehicle 10 thus altogether enables a design or location of the UWB transmitter/receiver (tag units 12) in a visible region of the transportation vehicle 10. These tag units 12 may be here positioned such that a tag unit 12 simultaneously illuminates the interior and exterior region of a transportation vehicle (see FIG. 6). Each tag unit 12 may be positioned in the window frame such that the radiation characteristic occurs in a region of at least 2*165°. The alignment of the tag units 12 is provided with a mechanical encoding 32 in such a way that different alignments represent the position in the transportation vehicle 10. A position sensor apparatus 42 in the tag unit 12 then reports its position in the transportation vehicle 10 and its own tag identification data 15 to the transportation vehicle. These tag identification data 15 (TAG_ID) are linked with the transportation vehicle identification data 16 (Fzg_ID) of the transportation vehicle 10 to form unmistakable identification data 18 (ID). The identification data 18 can also depend on the recognized characteristic position 28 (ID_Eigenpos). When a tag unit 12 is recognized in a retention device 14, this tag unit 12 can only be linked with this transportation vehicle 10. A tag unit 12 can only be removed when the transportation vehicle 10 is open.

When the transportation vehicle 10 has been locked once, the movement of the transportation vehicle 10 and of the tag units 12 is synchronized (by corresponding sensors of the tag units 12 and of the transportation vehicle 10), so that use by strangers is not possible. If the TAG is removed from the transportation vehicle 10 once, the unique ID_Eigenpos=TAG_ID+Fzg_ID is deleted. A new teaching is necessary.

Synchronization of the tag units 12 is carried out while traveling, so that while all the tag units 12 do have a different spacial alignment or orientation, they nevertheless have the same movement profile. These movement profiles can be compared, to assign valid identification data 18 only to such tag units 12 that have a movement profile concurring with the movement profile of the transportation vehicle 10. The distance 26 of the tag units 12 from one another can also be determined. It can be ensured in this way that the tag units 12 are located at the fixed characteristic positions 28 in the transportation vehicle 10, and that they have not been transposed.

The tag units 12 can measure the distance 29 to a mobile terminal 31, and can also communicate via a bidirectional interface.

The example altogether shows how a door locking controller can be made available by the disclosure in a transportation vehicle on the basis of UWB sensors.

LIST OF REFERENCE SIGNS

10 Transportation vehicle
11 Monitoring system
12 Tag unit
13 Central control unit
14 Retention device
15 Tag identification data
16 Transportation vehicle identification data
17 Wireless connection
18 Identification data
19 Electrical lines
20 Central locking system
21 Security function
22 UWB wireless signal
24 Distance
25 Surroundings
26 Access authorization transponder
27 UWB wireless signal
28 Characteristic position
29 Distance
30 Mobile terminal
31 Object position
32 Mechanical encoding
33 Splint
34 Recess
35 Electrical contact
36 Cover
37 Housing
38 Distance measuring apparatus
39 Spatial orientation
40 Front face
41 Rear face
42 Position measuring apparatus
43 Directional characteristic
44 Directional characteristic
45 Aperture angle
46 Region
47 Method
48 Monitoring mode
49 Tolerance value
S10-S17 Method operation

The invention claimed is:

1. A wireless-based monitoring system for monitoring a transportation vehicle, wherein the monitoring system comprises:
a central control unit; and
a plurality of mobile, portable tag units each including its own position sensor apparatus and its own distance measuring apparatus,
wherein the tag units are held in the transportation vehicle by respective retention devices, each retention device respectively having a mechanical encoding through which a spatial orientation of the held tag unit is specified,
wherein the spatial orientation of the held tag unit is characteristic of the installation position of the retention device in the transportation vehicle,
wherein each tag unit determines its spatial orientation and, thereby, its characteristic position in the transportation vehicle by its own position sensor apparatus, and transmits the characteristic position via wireless connection to the central control unit,
wherein, in a monitoring mode of the monitoring system, each tag unit, by its own distance measuring apparatus, repeatedly captures a distance from at least one predetermined object and signals the distance via wireless connection to the central control unit, and
wherein, the central control unit determines a respective object position of the at least one object based on the respective characteristic position of one or more of the plurality of tag units and the distances transmitted, and controls at least one predetermined transportation vehicle security function based on the determined object position.

2. The system of claim 1, wherein a position of a portable access authorization transponder of the transportation vehicle is determined, and a central locking system and/or an immobilizer is controlled as a security function.

3. The system of claim 2, wherein the control of the security function provides that the access authorization transponder must be present in the transportation vehicle during a starting attempt for starting the transportation vehicle and/or in a predetermined region surrounding the transportation vehicle during an opening attempt to open the transportation vehicle.

4. The system of claim 1, wherein an alarm system of the transportation vehicle is controlled as a security function.

5. The system of claim 1, wherein a function blockage of at least one predetermined function is controlled as a security function.

6. The system of claim 5, wherein, a keyless, wireless-based unlocking function of the transportation vehicle is deactivated by the function blockage in response to a change in the object position by an amount greater than a predetermined tolerance value.

7. The system of claim 1, wherein each of the tag units is held reversibly and releasably without damage by its respective retention device.

8. The system of claim 1, wherein an activity state of the respective tag unit is switched in each of the tag units by an individual movement sensor.

9. The system of claim 1, wherein the tag unit contained in the respective retention devices is supplied with electrical energy via electrical contacts in the retention device.

10. The system of claim 1, wherein the respective characteristic position of the tag units is determined at the beginning of a parking phase and the monitoring mode is started based on a locking signal that indicates a locking process of the transportation vehicle.

11. The system of claim 1, wherein unique identification data specific for each respective tag unit is used as transmitter identification during a data exchange between the tag units and the central control unit respectively, wherein the respective identification data is formed from unique tag identification data of the respective tag unit and unique transportation vehicle identification data specific for the transportation vehicle.

12. The system of claim 11, wherein the identification data is assigned by the central control unit for a respective tag unit in response to the tag unit having captured a spatial orientation that corresponds to the mechanical encoding of one of the retention devices, and the identification data in the tag unit is deleted when a respective tag unit is removed from its retention device.

13. A tag unit for a wireless-based monitoring system for monitoring a transportation vehicle, wherein the monitoring system comprises a central control unit and a plurality of the mobile, portable tag units, tag unit comprising:
a position sensor apparatus; and
a distance measuring apparatus,
wherein the tag units are held in the transportation vehicle by respective retention devices, each retention device respectively having a mechanical encoding through which a spatial orientation of the held tag unit is specified,
wherein the spatial orientation of the held tag unit is characteristic of the installation position of the retention device in the transportation vehicle,
wherein each tag unit determines its spatial orientation and, thereby, its characteristic position in the transportation vehicle by its own position sensor apparatus, and transmits the characteristic position via wireless connection to the central control unit,
wherein, in a monitoring mode of the monitoring system, each tag unit, by its own distance measuring apparatus, repeatedly captures a distance from at least one predetermined object and signals the distance via wireless connection to the central control unit,
wherein, the central control unit determines a respective object position of the at least one object based on the respective characteristic position of one or more of the plurality of tag units and the distances transmitted, and controls at least one predetermined transportation vehicle security function based on the determined object position.

14. The tag unit of claim 13, wherein a position of a portable access authorization transponder of the transportation vehicle is determined, and a central locking system and/or an immobilizer is controlled as a security function.

15. The tag unit of claim 14, wherein the control of the security function provides that the access authorization transponder must be present in the transportation vehicle during a starting attempt for starting the transportation vehicle and/or in a predetermined region surrounding the transportation vehicle during an opening attempt to open the transportation vehicle.

16. The tag unit of claim 13, wherein an alarm system of the transportation vehicle is controlled as a security function.

17. The tag unit of claim 13, wherein a function blockage of at least one predetermined function is controlled as a security function.

18. The tag unit of claim 17, wherein, a keyless, wireless-based unlocking function of the transportation vehicle is deactivated by the function blockage in response to a change in the object position by an amount greater than a predetermined tolerance value.

19. The tag unit of claim 13, wherein each of the tag units is held reversibly and releasably without damage by its respective retention device.

20. The tag unit of claim 13, wherein an activity state of the respective tag unit is switched in each of the tag units by an individual movement sensor.

21. The tag unit of claim 13, wherein the tag unit contained in the respective retention devices is supplied with electrical energy via electrical contacts in the retention device.

22. The tag unit of claim 13, wherein the respective characteristic position of the tag units is determined at the beginning of a parking phase and the monitoring mode is started based on a locking signal that indicates a locking process of the transportation vehicle.

23. The tag unit of claim 13, wherein unique identification data specific for each respective tag unit is used as transmitter identification during a data exchange between the tag units and the central control unit respectively, wherein the respective identification data is formed from unique tag identification data of the respective tag unit and unique transportation vehicle identification data specific for the transportation vehicle.

24. The tag unit of claim 23, wherein the identification data is assigned by the central control unit for a respective tag unit in response to the tag unit having captured a spatial orientation that corresponds to the mechanical encoding of one of the retention devices, and the identification data in the tag unit is deleted when a respective tag unit is removed from its retention device.

25. A transportation vehicle with a wireless-based monitoring system for monitoring a transportation vehicle, wherein the monitoring system comprises:
a central control unit;
a plurality of mobile, portable tag units each including its own position sensor apparatus and its own distance measuring apparatus; and
a plurality of retention devices, each corresponding to a respective tag unit of the plurality of mobile, portable tag units, wherein each of the retention devices respectively comprises a mechanical encoding through which a spatial orientation of the held tag unit is specified, wherein the spatial orientation of the held tag unit is unique for the installation position of the respective retention device in the transportation vehicle, wherein the spatial orientation of the held tag unit is characteristic of the installation position of the retention device in the transportation vehicle,
wherein each tag unit determines its spatial orientation and, thereby, its characteristic position in the transportation vehicle by its own position sensor apparatus, and transmits the characteristic position via wireless connection to the central control unit,
wherein, in a monitoring mode of the monitoring system, each tag unit, by its own distance measuring apparatus, repeatedly captures a distance from at least one predetermined object and signals the distance via wireless connection to the central control unit, and
wherein, the central control unit determines a respective object position of the at least one object based on the respective characteristic position of one or more of the plurality of tag units and the distances transmitted, and controls at least one predetermined transportation vehicle security function based on the determined object position.

26. The transportation vehicle of claim 25, wherein a position of a portable access authorization transponder of the transportation vehicle is determined, and a central locking system and/or an immobilizer is controlled as a security function.

27. The transportation vehicle of claim 26, wherein the control of the security function provides that the access authorization transponder must be present in the transportation vehicle during a starting attempt for starting the transportation vehicle and/or in a predetermined region surrounding the transportation vehicle during an opening attempt to open the transportation vehicle.

28. The transportation vehicle of claim 25, wherein an alarm system of the transportation vehicle is controlled as a security function.

29. The transportation vehicle of claim 25, wherein a function blockage of at least one predetermined function is controlled as a security function.

30. The transportation vehicle of claim 29, wherein, a keyless, wireless-based unlocking function of the transportation vehicle is deactivated by the function blockage in response to a change in the object position by an amount greater than a predetermined tolerance value.

31. The transportation vehicle of claim 25, wherein each of the tag units is held reversibly and releasably without damage by its respective retention device.

32. The transportation vehicle of claim 25, wherein an activity state of the respective tag unit is switched in each of the tag units by an individual movement sensor.

33. The transportation vehicle of claim 25, wherein the tag unit contained in the respective retention devices is supplied with electrical energy via electrical contacts in the retention device.

34. The transportation vehicle of claim 25, wherein the respective characteristic position of the tag units is determined at the beginning of a parking phase and the monitoring mode is started based on a locking signal that indicates a locking process of the transportation vehicle.

35. The transportation vehicle of claim 25, wherein unique identification data specific for each respective tag unit is used as transmitter identification during a data exchange between the tag units and the central control unit respectively, wherein the respective identification data is formed from unique tag identification data of the respective tag unit and unique transportation vehicle identification data specific for the transportation vehicle.

36. The transportation vehicle of claim 35, wherein the identification data is assigned by the central control unit for a respective tag unit in response to the tag unit having captured a spatial orientation that corresponds to the mechanical encoding of one of the retention devices, and the identification data in the tag unit is deleted when a respective tag unit is removed from its retention device.

37. A method for operating a wireless-based monitoring system of a transportation vehicle, wherein a central control unit and a plurality of mobile, portable tag units are made available by the monitoring system and the tag units are held in the transportation vehicle by a respective retention device, the method comprising:
each tag unit determining its spatial orientation by its own position sensor apparatus, wherein the tag units are held in the transportation vehicle by respective retention devices, each retention device respectively having a mechanical encoding through which a spatial orientation of the held tag unit is specified, wherein the spatial orientation of the held tag unit is characteristic for the installation position of the retention device in the transportation vehicle;
each tag determining its characteristic position in the transportation vehicle based on the determined spatial orientation and thereby its characteristic position in the transportation vehicle;
each tag transmitting its characteristic position via wireless connection to the central control unit; and
in a monitoring mode of the monitoring system, each tag unit, by its own distance measuring apparatus, repeatedly capturing a distance from at least one predetermined object and transmitting the measured distance via wireless connection to the central control unit;
determining, by the central control unit, a respective object position of the at least one object based on the respective characteristic position of at least one or a few of the tag units and of the distances signaled respectively by this tag unit or these tag units; and
controlling at least one predetermined security function in the transportation vehicle depending on the respective determined object position of the at least one object.

38. The method of claim 37, further comprising determining a position of a portable access authorization transponder of the transportation vehicle, and controlling a central locking system and/or an immobilizer as a security function.

39. The method of claim 38, wherein the control of the security function provides that the access authorization transponder must be present in the transportation vehicle during a starting attempt for starting the transportation vehicle and/or in a predetermined region surrounding the transportation vehicle during an opening attempt to open the transportation vehicle.

40. The method of claim 37, wherein an alarm system of the transportation vehicle is controlled as a security function.

41. The method of claim 37, wherein a function blockage of at least one predetermined function is controlled as a security function.

42. The method of claim 41, wherein, a keyless, wireless-based unlocking function of the transportation vehicle is deactivated by the function blockage in response to a change in the object position by an amount greater than a predetermined tolerance value.

43. The method of claim 37, wherein each of the tag units is held reversibly and releasably without damage by its respective retention device.

44. The method of claim 37, wherein an activity state of the respective tag unit is switched in each of the tag units by an individual movement sensor.

45. The method of claim 37, wherein the tag unit contained in the respective retention devices is supplied with electrical energy via electrical contacts in the retention device.

46. The method of claim 37, wherein the respective characteristic position of the tag units is determined at the beginning of a parking phase and the monitoring mode is started based on a locking signal that indicates a locking process of the transportation vehicle.

47. The method of claim 37, wherein unique identification data specific for each respective tag unit is used as transmitter identification during a data exchange between the tag units and the central control unit respectively, wherein the respective identification data is formed from unique tag identification data of the respective tag unit and unique transportation vehicle identification data specific for the transportation vehicle.

48. The method of claim 47, wherein the identification data is assigned by the central control unit for a respective tag unit in response to the tag unit having captured a spatial orientation that corresponds to the mechanical encoding of one of the retention devices, and the identification data in the tag unit is deleted when a respective tag unit is removed from its retention device.

* * * * *